United States Patent
Hofmann et al.

(10) Patent No.: US 11,096,061 B2
(45) Date of Patent: Aug. 17, 2021

(54) METHOD AND DEVICE TO PROVIDE A COEXISTENCE MECHANISM FOR TWO DIFFERENT WIRELESS COMMUNICATION TECHNOLOGIES ON A SHARED FREQUENCY RANGE

(71) Applicant: Robert Bosch GmbH, Stuttgart (DE)

(72) Inventors: Frank Hofmann, Hildesheim (DE); Nadia Brahmi, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 16/631,519

(22) PCT Filed: Jun. 11, 2018

(86) PCT No.: PCT/EP2018/065298
§ 371 (c)(1),
(2) Date: Jan. 16, 2020

(87) PCT Pub. No.: WO2019/015873
PCT Pub. Date: Jan. 24, 2019

(65) Prior Publication Data
US 2020/0154282 A1  May 14, 2020

(30) Foreign Application Priority Data

Jul. 18, 2017 (DE) .......................... 102017212245.5
Oct. 13, 2017 (DE) .......................... 102017218321.7

(51) Int. Cl.
*H04W 16/14* (2009.01)
*H04W 4/44* (2018.01)
(Continued)

(52) U.S. Cl.
CPC ............. *H04W 16/14* (2013.01); *H04W 4/44* (2018.02); *H04W 28/26* (2013.01);
(Continued)

(58) Field of Classification Search
CPC ... H04W 72/1231; H04W 4/40; H04W 16/14; H04W 72/1284; H04W 72/14;
(Continued)

(56) References Cited

U.S. PATENT DOCUMENTS

2017/0188391 A1* 6/2017 Rajagopal ......... H04W 74/0816
2018/0049219 A1* 2/2018 Gupta ................... H04L 5/0041
(Continued)

OTHER PUBLICATIONS

IEEE 802.11P-2010 Standard "IEEE Standard for Information Technology—Local and Metropolitan Area Networks—Specific Requirements—Part 11: Wireless LAN Medium Access Control (MAC) and Physical Layer (PHY) Specifications, Amendment 6: Wireless Access in Vehicular Enviroments", Jun. 2010, 51 pages.
(Continued)

*Primary Examiner* — Mewale A Ambaye
(74) *Attorney, Agent, or Firm* — Norton Rose Fulbright US LLP; Gerard Messina (57) ABSTRACT

A method for operating a network infrastructure-side network unit is provided which includes: sending a first indication to a number of roadside network units of a cell-based wireless communications network, the first indication including a reservation of sidelink resources of a sidelink channel in an unlicensed frequency range in a first time frame; and sending a second indication to a number of roadside network units of an ad hoc wireless communications network, the second indication including a reservation of an ad hoc channel in the unlicensed frequency range for a second time frame, the first and the second time frames being temporally disjoint.

12 Claims, 4 Drawing Sheets

(51) Int. Cl.
  *H04W 76/15* (2018.01)
  *H04W 76/18* (2018.01)
  *H04W 76/14* (2018.01)
  *H04W 28/26* (2009.01)
  *H04W 72/04* (2009.01)
  *H04W 84/18* (2009.01)

(52) U.S. Cl.
  CPC ... *H04W 72/0446* (2013.01); *H04W 72/0453* (2013.01); *H04W 76/14* (2018.02); *H04W 76/15* (2018.02); *H04W 76/18* (2018.02); *H04W 84/18* (2013.01)

(58) Field of Classification Search
  CPC . H04W 84/18; H04W 92/18; H04W 72/1252; H04W 72/1257; H04W 72/12; H04W 4/42; H04W 4/44; H04W 4/46; H04W 4/48; H04W 16/00; H04W 72/1289; H04W 28/12; H04W 84/05; H04L 29/08306; H04L 29/08567
  See application file for complete search history.

(56) References Cited

U.S. PATENT DOCUMENTS

| | | | |
|---|---|---|---|
| 2018/0049220 A1* | 2/2018 | Patil | H04W 72/1247 |
| 2019/0141694 A1* | 5/2019 | Gupta | H04W 24/10 |
| 2019/0141726 A1* | 5/2019 | Wang | H04L 5/0037 |
| 2020/0170023 A1* | 5/2020 | Kim | H04W 72/1289 |

OTHER PUBLICATIONS

International Search Report for PCT/EP2018/065298, dated Oct. 5, 2018.
ZTE: "Co-Channel Coexistence Between DSRC and LTE V2V on Same Channel", 3GPP Draft: R1-1609807—Co-Channel Coexistence Between DSRC and LTE V2V, 3rd Generation Partnership Project (3GPP), Mobile Competence Centre ; 650, Route Des Lucioles ; F-06921 Sophia-Antipolis Cedex BD. RAN WG1, NR . Lisbon, Portugal ; Oct. 10, 2016-Oct. 14, 2016, 2016, XP051158593. URL:http://www.3gpp.org/ftp/tsg_ran/wg1_rl1/tsgr1_86b/docs/, 8 pages.
Samsung: "Revisiting of Long Term Co-Channel Coexistence Solution Between IEEE802.11P/DSRC and LTE-V2X", 3GPP Draft; R2-168094, 3rd Generation Partnership Project (3GPP), Mobile Competence Centre ; 650, Route Des Lucioles; F-06921 Sophia-Antipolis Cedex; France, BD. Ran WG2, NR, Reno, USA; Nov. 14, 2016-Nov. 18, 2016, 2016, XP051192373. URL:http://www.3gpp.org/ftp/tsg_ran/wg2_rl2/tsgr2_96/docs/, 4 pages.
3GPP TS 36.300 V14.2.0 (Mar. 2017), 330 pages.
IEEE 802.11P-2010 Standard "IEEE Standard for Information Technology—Local and Metropolitan Area Networks—Specific Requirements—Part 11: Wireless LAN Medium Control (MAC) and Physical Layer (PHY) Specifications, Amendment 6: Wireless Access in Vehicular Environments", May 2009, 42 pages.
ETSI EN 302 663 V1.2.0 (Nov. 2012), 24 pages.
ETSI TS 102 687 V1.1.1 (Jul. 2011), 45 pages.
ETSI TS 136 300 V14.2.0 (Apr. 2017), 346 pages.

* cited by examiner

METHOD AND DEVICE TO PROVIDE A COEXISTENCE MECHANISM FOR TWO DIFFERENT WIRELESS COMMUNICATION TECHNOLOGIES ON A SHARED FREQUENCY RANGE

FIELD

The present invention relates to a method for operating a network infrastructure-side network unit, a network infrastructure-side network unit, a method for operating a roadside network unit, and a roadside network unit.

BACKGROUND INFORMATION

Present vehicles are able to exchange information with other vehicles in their vicinity (V2V: vehicle-to-vehicle). In addition, vehicles may communicate wirelessly with roadside infrastructure (V2I: vehicle-to-infrastructure). The vehicle may also communicate wirelessly with a backend server on the Internet (V2N: vehicle-to-network) or with a pedestrian terminal (V2P: vehicle-to-person). This communication is also referred to overall as "vehicle-to-everything" (V2X).

The development of new functions and services in the automotive industry, for example automated driving, benefits from V2X. Traffic safety, driving comfort, and energy efficiency may be improved. This results in new products and business models for automotive manufacturers, automotive suppliers, and other service providers.

The first generation of V2X applications, to be used in the years ahead, is based primarily on use on the road. Their purpose is to provide the driver with information about the road surroundings. Vehicles periodically provide status information (for example, position, speed, acceleration, etc.) and/or event information (rescue operations, a broken-down vehicle, traffic jams). This information is generally transmitted locally in the form of text messages. This event-based information may be sent to a central network unit (base station, backend) by neighboring vehicles.

For V2X direct device-to-device (D2D) communication, there are presently two competing technologies. The first technology is based on the radio-based IEEE 802.11p standard, which forms the basis for the comprehensive Dedicated Short Range Communication (DSRC) standard in the United States and the European Telecommunications Standards Institute (ETSI) Intelligent Transport Systems (ITS) G5 standard in Europe. The second technology is based on 3rd Generation Partnership Project (3GPP) Long Term Evolution (LTE), also known by the abbreviation LTE-V2X. An enhancement of the LTE-V2X technology is expected with 5G (5th generation mobile networks).

The IEEE 802.11p standard uses the PHY layer of the IEEE 802.11a standard, based on orthogonal frequency division multiplexing (OFDM) with some modifications. The MAC layer is based on enhanced distributed channel access (EDCA), which is competition-based. In addition, carrier sense multiple access (CSMA) with collision avoidance (CSMA/CA) is used. CSMA/CA follows the "listen before talk" principle for minimizing collisions on the channel. When a network unit (in the present context, a vehicle) has data to transmit, it carries out a channel measurement to check whether the channel is occupied. If the channel is detected as empty, the network unit waits with the planned transmission for a randomly ascertained time, and then begins with the transmission. If the channel is occupied during the channel measurement, the network unit will carry out a backoff procedure; i.e., it awaits the next channel access for a randomly ascertained time period. The greater the number of network units that attempt to transmit in a geographical area, the greater the likelihood that a network unit delays its transmission, resulting in overall greater delays in the network. The IEEE 802.11p standard offers advantages over other WLAN standards, based on IEEE 802.11, with regard to latency and signaling complexity, and is adapted to the V2V application.

The LTE enhancement for V2X beginning with 3GPP Release 14 provides for the use of a licensed and/or unlicensed spectrum for the communication. The V2V communication is based on a direct device-to-device interface (also referred to as a sidelink interface on the physical layer). In contrast to 802.11p, the transmission takes place with cell support, i.e., is carried out by the network in a planned manner. Transmission rights are granted by a scheduler unit situated in the base station, thus avoiding collisions and minimizing interferences. The control by the base station can be carried out only in areas in which the base station signal is available (in coverage). In a case in which no base station signal is available (out of coverage), the communication takes place with predefined parameters via the sidelink.

In the course of the development of communication standards, for example starting from different applications or development activities from different technical fields, various standards may be proposed for the same frequency range. As a result, different wireless communication systems would transmit in the same frequency range, resulting in impaired performances for both technologies.

Consequently, one could formulate an objective technical object to provide a coexistence mechanism for the two different wireless communication technologies in order to equitably distribute available resources on a shared frequency range.

SUMMARY

An object of the present invention is to provide a method for operating a network infrastructure-side network unit, a network infrastructure-side network unit, a method for operating a roadside network unit, and a roadside network unit.

According to a first and second aspect of the present invention, an example network infrastructure-side network unit is operated, for example, as follows: sending a first indication to a number of roadside network units of a cell-based wireless communications network, the first indication including a reservation of sidelink resources of a sidelink channel in an unlicensed frequency range in a first time frame; and sending a second indication to a number of roadside network units of an ad hoc wireless communications network, the second indication including a reservation of an ad hoc channel in the unlicensed frequency range for a second time frame, the first and second time frames being temporally disjoint.

As the result of providing the first and second time frames, two nonintersecting time periods that are temporally disjoint, i.e., different from one another, are advantageously provided which are utilized once by the one type of wireless communications network, and once by the other type of wireless communications network. The unlicensed frequency range is thus used by different types of network units, which either have no access to the ad hoc channel or have no access to the sidelink channel.

The two indications, via a type of time division multiplexing (TDM), ensure that the likelihood of a collision in the unlicensed frequency range is reduced. Availability of the data is increased in both types of networks, and transmission latency in both types of networks is reduced. Accordingly, an equitable distribution of the available resources in the unlicensed frequency range is achieved.

According to a third and fourth aspect of the present invention, an example roadside network unit is operated, for example, as follows: ascertaining useful data for sending to a further roadside network unit of the ad hoc wireless communications network; receiving an indication from a network infrastructure-side network unit, the indication including a reservation of an ad hoc channel in an unlicensed frequency range for a time frame; arbitrating the ad hoc channel during the time frame, and sending the useful data to the further roadside network unit on the ad hoc channel during the time frame if the arbitration of the ad hoc channel was successful.

Thus, the provided network unit refrains from arbitrating the ad hoc channel outside the predefined time frame. This means that outside the time frame, a communication may take place that is not based on the ad hoc channel. The unlicensed frequency range may thus be used by other network units that do not have access to the ad hoc channel.

As a whole, the provided method and roadside network units may advantageously allow an equitable distribution of resources between two wireless communications networks that operate in the same frequency range.

Further features and advantages are described below in the context of exemplary embodiments of the present invention.

DETAILED DESCRIPTION OF EXAMPLE EMBODIMENTS

Figure 1:
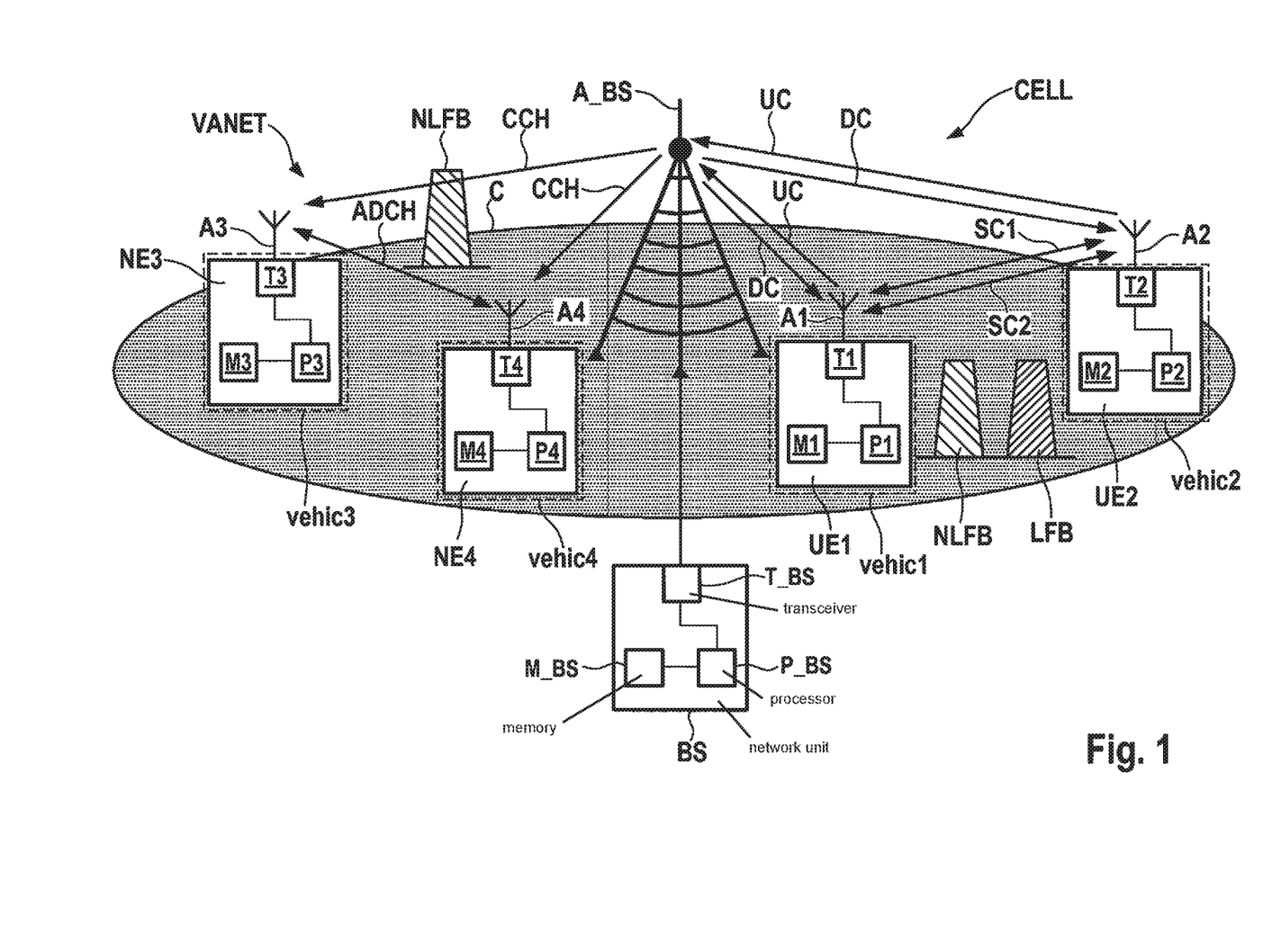
FIG. 1 shows a first cell-based wireless communications network and a second wireless communications network.

FIG. 1 shows a cell-based wireless communications network CELL and an ad hoc wireless communications network VANET. Cell-based wireless communications network CELL includes a network infrastructure-side network unit BS, a first roadside network unit UE1, and a roadside network unit UE2. Network infrastructure-side network unit BS includes a processor P_BS, a memory element M_BS, and a transceiver T_BS. Network infrastructure-side network unit BS may also be referred to as a base station or eNodeB. Network infrastructure-side network unit BS is connected to a stationary antenna A_BS in order to transmit data on a downlink channel DC and to receive data on an uplink channel UC. Antenna A_BS includes, for example, a number of antennas and is designed as a remote radio head (RRH), for example. Network infrastructure-side network unit BS and antenna A_BS provide a cell C within which roadside network units UE1 and UE2 may communicate with network unit BS. Of course, network infrastructure-side network unit BS may also have a distributed design within the scope of a virtualization, and may be made up of separate network units. Network units BS, UE1, and UE2 are configured according to the LTE-V2X standard, for example.

Roadside network unit UE1 includes a processor P1, a memory element M1, a transceiver T1, and an antenna A1. Roadside network unit UE2 includes a processor T2, a memory element M2, a transceiver T2, and an antenna A2.

The two roadside network units UE1, UE2 are situated within cell C, and are able to receive data on downlink channel DC and to send data on uplink channel UC. The two roadside network units UE1, UE2 are able to communicate directly with one another in an unlicensed frequency range NLFB via a sidelink channel SC1 and in a licensed frequency range LFB via a sidelink channel SC2.

In the present description, reference is made to single uplink channel UC and single downlink channel DC. For example, uplink channel UC and downlink channel DC each include subchannels; i.e., multiple channels are available in the uplink and in the downlink. The same applies for sidelink channels SC1, SC2.

Ad hoc wireless communications network VANET includes roadside network units NE3 and NE4. Network unit NE3 includes a processor P3, a memory element M3, a transceiver T3, and an antenna A3. Network unit NE4 includes a processor P4, a memory element M4, a transceiver T4, and an antenna A4. Transceivers T3 and T4 are configured according to the IEEE 802.11p standard, for example. Network units NE3 and NE4 communicate directly with one another in unlicensed frequency range NLFB via an ad hoc channel ADCH. Ad hoc channel ADCH is arbitrated by transceivers T3, T4 via a carrier sense multiple access/collision avoidance (CSMA/CA) protocol.

Network units NE3 and NE4 are situated proximate to network units UE1 and UE2. Due to this proximity, the respective transmission power output may be sufficient for transmissions on channels ADCH and SC1, which are transmitted in same unlicensed frequency range NLFB, to have a mutual adverse influence. An aim of the present invention is to reduce this mutual adverse influence.

Roadside network units UE1, UE2, NE3, and NE4 are situated in motor vehicles vehic1, vehic2, vehic3, vehic4, respectively, and are connected to a control unit for data exchange, not shown, respectively situated therein. Alternatively, roadside network units UE1, UE2, NE3, and NE4 are part of the control unit in motor vehicle vehic1, vehic2, vehic3, vehic4, respectively. In another alternative specific embodiment, roadside network units UE1, UE2, NE3, and NE4 are situated in a stationary infrastructure such as a traffic light instead of in a motor vehicle.

Sidelink channels SC1, SC2 and a sidelink are generally defined, for example, by the document "3GPP TS 36.300 V14.2.0 (2017-03)," which is incorporated herein by reference in its entirety into the present description. The sidelink includes sidelink discovery, sidelink communication, and V2X sidelink communication between network units UE1, UE2. The sidelink uses uplink resources and a physical channel structure similarly as for the uplink. Thus, the sidelink differs from the uplink with regard to the physical channel.

The sidelink is limited to individual cluster transmissions for the physical sidelink channels. In addition, the sidelink uses a one-symbol gap at the end of each sidelink subframe. For the V2X sidelink communication, physical sidelink control channel (PSCCH) and physical sidelink shared channel (PSSCH) are transmitted in the same subframe. Sidelink channels SC1, SC2 are the PSSCH, for example.

The physical layer processing of transport channels in the sidelink differs from the uplink transmission in the following steps: scrambling: for physical sidelink discovery channel (PSDCH) and PSCCH the scrambling is not specific for the network unit; modulation: 64 quadrature amplitude modulation (QAM) and 256 QAM are not supported for the sidelink. The PSCCH indicates sidelink resources and other transmission parameters that are used by particular network unit UE1, UE2 for the PSSCH.

For the PSDCH, PSCCH, and PSSCH demodulation, reference signals similar to the uplink demodulation reference signals are transmitted in the fourth symbol of the slot in normal cyclic prefix CP, and in the third symbol of the slot in expanded CP. The sidelink demodulation reference signal sequence length corresponds to the size (number of subcarriers) of the associated resource. For the V2X sidelink communication, reference signals are transmitted in the third and sixth symbols of the first slot and in the second and fifth symbols of the second slot in the CP. For PSDCH and PSCCH, reference signals based on a fixed base sequence, cyclic shift, and orthogonal cover code are generated. For the V2X sidelink communication, the cyclic shift for PSCCH is randomly selected for each transmission.

For measurements of particular sidelink channel SC1, SC2, the following options are available on the side of network units UE1, UE2: reception power output of the sidelink reference signal (S-RSRP); reception power output of the sidelink discovery reference signal (SD-RSRP); reception power output of the PSSCH reference signal (PSSCH-RSRP); signal strength indicator for sidelink reference signals (S-RSSI).

Ad hoc channel ADCH and ad hoc wireless communications network VANET are defined by the IEEE 802.11p-2010 standard "IEEE standard for information technology—Local and metropolitan area networks—Specific requirements—Part 11: Wireless LAN medium access control (MAC) and physical layer (PHY) specifications, Amendment 6: Wireless access in vehicular environments," which is incorporated herein by reference in its entirety into the present description. IEEE 802.11p is a standard for enhancement of the WLAN IEEE 802.11 standard. The objective of IEEE 802.11p is to establish the WLAN technology in passenger vehicles and provide a reliable interface for applications for intelligent transport systems (ITSs). IEEE 802.11p is also the basis for dedicated short-range communication (DSRC) in the frequency band of 5.85 to 5.925 GHz. To avoid confusion with the European DSRC version, the term ITS-G5 is used instead of DSRC, in particular in Europe.

The document "ETSI EN 302 663 V1.2.0 (2012-11)," which is incorporated herein by reference in its entirety into the present description, describes both lowermost layers of the ITS-G5 technology (ITS G5: intelligent transport systems operating in the 5 GHz frequency band), the physical layer, and the data link layer. Transceivers T3 and T4 implement at least these two lowermost layers and corresponding functions, for example, according to "ETSI EN 302 663 V1.2.0 (2012-11)" in order to use ad hoc channel ADCH. For use of ad hoc channel ADCH, in Europe the following unlicensed frequency ranges are available which are part of unlicensed frequency range NLFB: 1) ITS-G5A for safety-relevant applications in the frequency range of 5.875 GHz to 5.905 GHz; 2) ITS-G5B for non-safety-relevant applications in the frequency range of 5.855 GHz to 5.875 GHz; and 3) ITS-G5D for the operation of ITS applications in the frequency range of 5.905 GHz to 5.925 GHz. ITS-G5 allows communication between the two network units UE1 and UE2 outside the context of a base station. ITS-G5 allows the immediate exchange of data frames, and avoids management overhead used in setting up a network.

The document "ETSI TS 102 687 V1.1.1 (2011-07)," which is incorporated herein by reference in its entirety into the present description, describes a decentralized congestion control mechanism for ITS-G5. Ad hoc channel ADCH is used, among other things, for the exchange of data concerning traffic safety and traffic efficiency. Transceivers T3 and T4 implement, for example, the functions described in the document "ETSI TS 102 687 V1.1.1 (2011-07)." The applications and services in ITS-G5 are based on the cooperative behavior of the roadside network units that form the vehicular ad hoc network (VANET). Ad hoc network VANET allows time-critical road traffic applications in which rapid information exchange is necessary to warn and assist the driver and/or the vehicle in a timely manner. To ensure proper functioning of ad hoc network VANET, the decentralized congestion control (DCC) mechanism for ad hoc channel ADCH is used by ITS-G5. DCC includes functions that are situated on multiple layers of the ITS architecture. The DCC mechanisms are based on knowledge concerning the channel. The channel status information is obtained by channel sounding. Channel status information may be obtained via the transmit power control (TPC), transmit rate control (TRC), and transmit data rate control (TDC) methods. The methods ascertain the channel status information as a function of reception signal level thresholds or preamble information of detected packets.

Transceiver T_BS and antenna A_BS are designed to set up a control channel CCH for network units NE3 and NE4. There are multiple options for the design of control channel CCH. In one specific embodiment, control channel CCH is a subchannel of downlink channel DC according to 3GPP TS 36.300 V14.2.0 (2017-03). Transceivers T3 and T4 and antennas A3 and A4 are designed to synchronize to form a synchronization signal based on network unit BS, and to read data on control channel CCH. A reduced protocol stack according to 3GPP TS 36.300 V14.2.0 (2017-03) is also sufficient for this purpose.

In one alternative specific embodiment, control channel CCH has a design that is analogous to ad hoc channel ADCH, and uses unlicensed frequency range NLFB. As a result, transceiver T_BS and antenna A_BS are designed to transmit to network units NE3, NE4 on the ad hoc channel according to control channel CCH. For example, transceiver T_BS and antenna A_BS are designed according to the IEEE 802.11p-2010 standard, a reduced protocol stack also being sufficient to transmit on control channel CCH.

Figure 2:
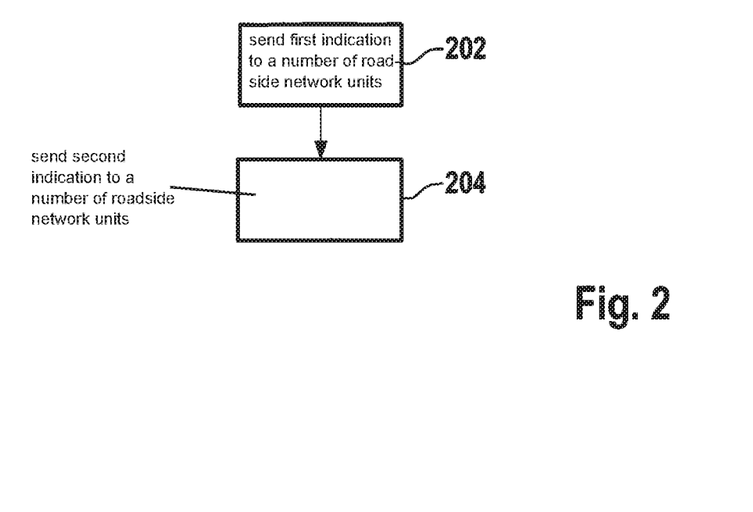
FIGS. 2 and 3 each show a schematic flow chart.

FIG. 2 shows a schematic flow chart for operating network infrastructure-side network unit BS from FIG. 1. A first indication is sent to a number of roadside network units of the cell-based wireless communications network in a step 202, the first indication including a reservation of sidelink resources of the sidelink channel in the unlicensed frequency range within a first time frame. This first indication corresponds at least to a scheduling grant message, which includes an explicit assignment of sidelink resources to one of the network units of the cell-based wireless communications network. A second indication is sent to a number of roadside network units of the ad hoc wireless communications network in a step 204. The second indication includes a second time frame within which the roadside network units of the ad hoc wireless communications network are allowed to actively utilize the ad hoc channel in the unlicensed frequency range. Outside this second time frame, the network units of the ad hoc wireless communications network are prohibited from utilizing the ad hoc channel. During this prohibition of use of the ad hoc channel, for example the sidelink channel that shares the unlicensed frequency range with the ad hoc channel is utilized. The utilization of the sidelink channel in the unlicensed frequency range is determined by network unit BS in that the sidelink resources of the sidelink channel are scheduled by the network infrastructure-side network unit.

Figure 3:
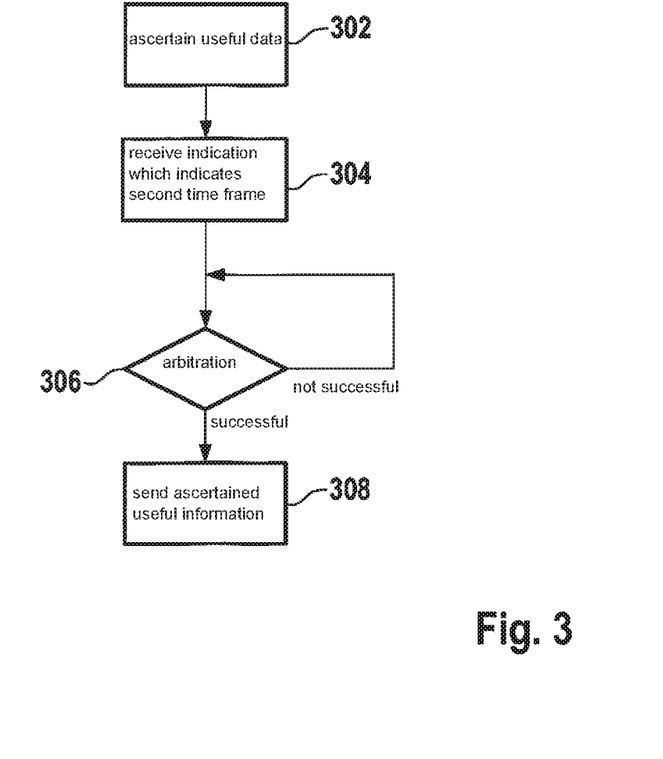

FIG. 3 shows a schematic flow chart for operating roadside network units NE3, NE4 of ad hoc wireless communications network VANET from FIG. 1. Useful data for sending to a further roadside network unit of the ad hoc wireless communications network are ascertained in a step 302. The indication which indicates the second time frame is received by the network infrastructure-side network unit in a step 304. Ad hoc channel ADCH is arbitrated during the second time frame in a step 306. This means that an arbitration takes place only when the network unit determines that the second time frame is active, or that one is in the second time frame. The arbitration includes a channel test as to whether the radio resources provided for the utilization are free on the ad hoc channel. If the arbitration in step 306 is successful, the network unit sends the ascertained useful data to the further roadside network unit on the ad hoc channel during the second time frame in a step 308.

Figure 4:
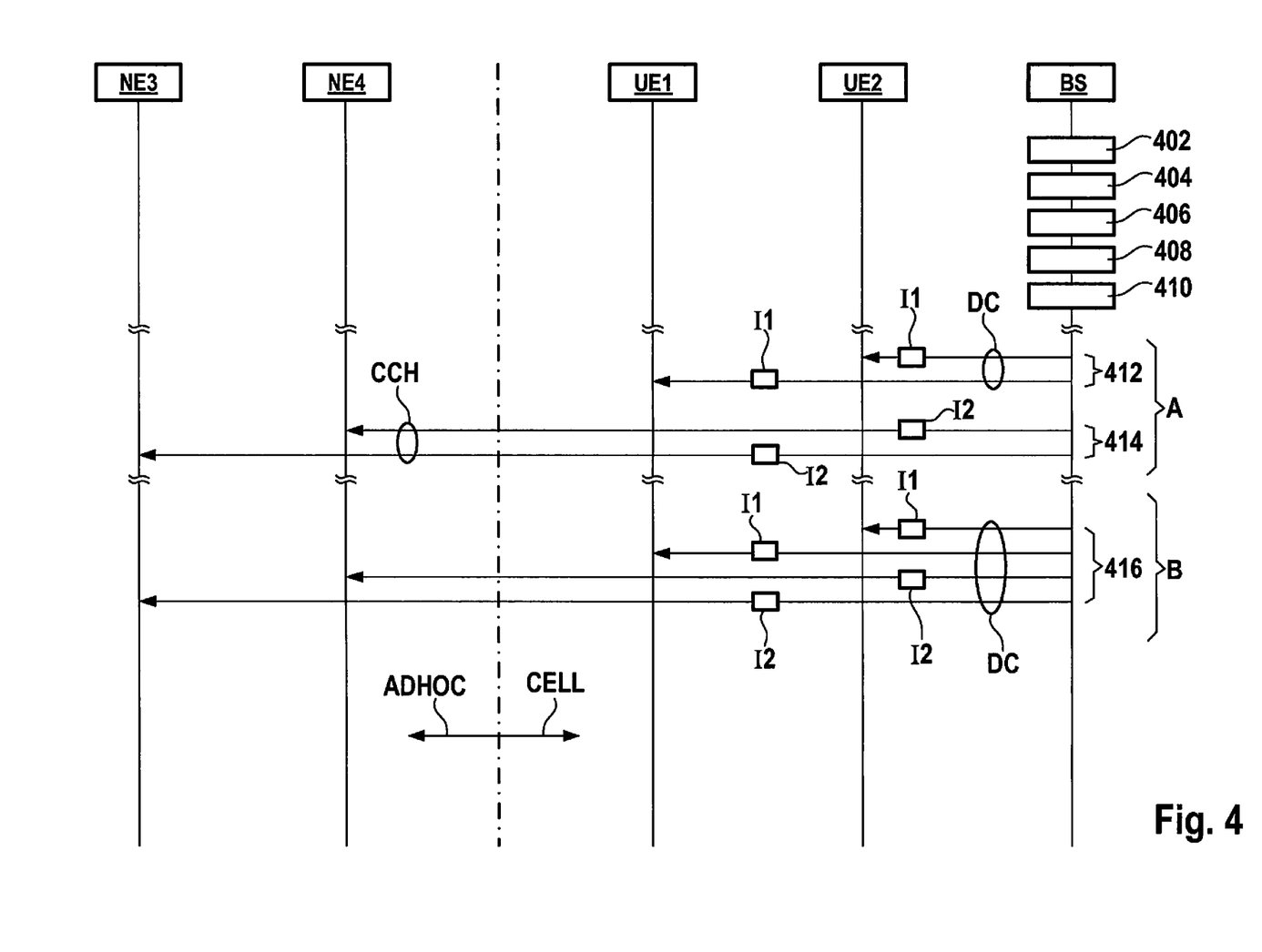
FIGS. 4 and 5 each show a schematic sequence diagram.

FIG. 4 shows a schematic sequence diagram. A state of sidelink channel SC1 in the unlicensed frequency range from FIG. 1 is ascertained in a step 402. The state of sidelink channel SC1 includes, for example, a piece of occupancy information with regard to the first time frame. The size of the first time frame is ascertained as a function of the state of the sidelink channel in a step 404. If sidelink channel SC1 has a capacity utilization of 80%, for example, the first time frame is increased. If sidelink channel SC1 has a capacity utilization of 50%, for example, the first time frame is decreased.

The state of the ad hoc channel is ascertained in step 406. The state of the ad hoc channel includes, for example, the number of network units that are accessible and capable of ad hoc communication. The size of the second time frame is ascertained as a function of the state of the ad hoc channel in a step 408. Alternatively or additionally, the network units of the ad hoc wireless communications network are associated with different groups in step 408, the two groups accessing the second time frame in alternation. This alternating access to the second time frame reduces the likelihood of a collision on the ad hoc channel. In one specific embodiment, more than two groups are formed, each group having exclusive access to one of multiple chronologically subsequent second time frames. The size of the second time frame and/or the group association are/is sent as second indication I2, for example. If second indication I2 includes the size of the second time frame, second indication I2 is also regarded as an indicator for the division of, for example, a fixed higher-order time frame.

Scheduling of the sidelink resources takes place within the first time frame, and first indication I1 is ascertained, in a step 410. First indication I1 thus includes an allocation of sidelink resources within the first time frame. Thus, all assigned sidelink resources are situated within the first time frame. The network units of the cell-based wireless communications network thus send their useful data on the sidelink channel only within the first time frame.

The first and second time frames are situated in the higher-order time frame. The higher-order time frame is shortened in a manner not shown, for example starting from a magnitude of 100 ms, when one of the network units of the wireless communications networks receives a service indication that requires a reduced service latency.

As an alternative to steps 402 through 410, the first time frame and the second time frame are persistent or semi-persistent, semi-persistent meaning that the division of the higher-order time frame into the first and second time frames takes place according to a number of division schemes. A division scheme includes, for example, a proportion of 20% of the higher-order time frame for the sidelink channel and a proportion of 80% of the higher-order time frame for the ad hoc channel. The division scheme also includes a sequence of the first and second time frames within the higher-order time frame.

According to a first specific embodiment A, first indication I1 is sent to network units UE1 and UE2 on downlink channel DC in a step 412. Second indication I2 is sent to network units NE3 and NE4 on control channel CCH according to a step 414. In specific embodiment A, transceiver T_BS of network unit BS from FIG. 1 is designed to set up control channel CCH in ad hoc wireless communications network VANET.

According to a second specific embodiment B, first and second indications I1, I2 are sent to network units UE1 through NE4 on downlink channel DC in a step 416. For this purpose, transceivers T3 and T4 from FIG. 1 do not have to include the entire functionality as for transceivers T1 and T2, and instead may include a comparatively reduced functional scope. In specific embodiment B, transceivers T3 and T4 from FIG. 1 are thus at least designed to receive a synchronization signal from network unit BS, synchronize thereto, and make read access to downlink channel DC on which indications I1, I2 are transmitted.

First indication I1 provides network units UE1, UE2 with scheduling information, i.e., assignments of sidelink resources of sidelink channel SC1. First indication I1 is adapted by network unit BS to the situation in cell-based wireless communications network CELL and is sent to network units UE1, UE2, which transmit/receive only on the assigned sidelink resources.

Second indication I2 provides network units NE3, NE4 with second time frame T2, i.e., a release of ad hoc resources of the ad hoc channel. Network units NE3, NE4 arbitrate the ad hoc channel according to the CSMA/CA method. Second indication I2 is adapted by network unit BS to the situation in ad hoc wireless communications network CELL. Alternatively, second indication I2 is persistent or semi-persistent in the sense of the size of the time frame. In the case of a persistent or semi-persistent design, network units NE3, NE4 are informed of the second time frame with the aid of an indication, explained with reference to FIG. 5.

Figure 5:
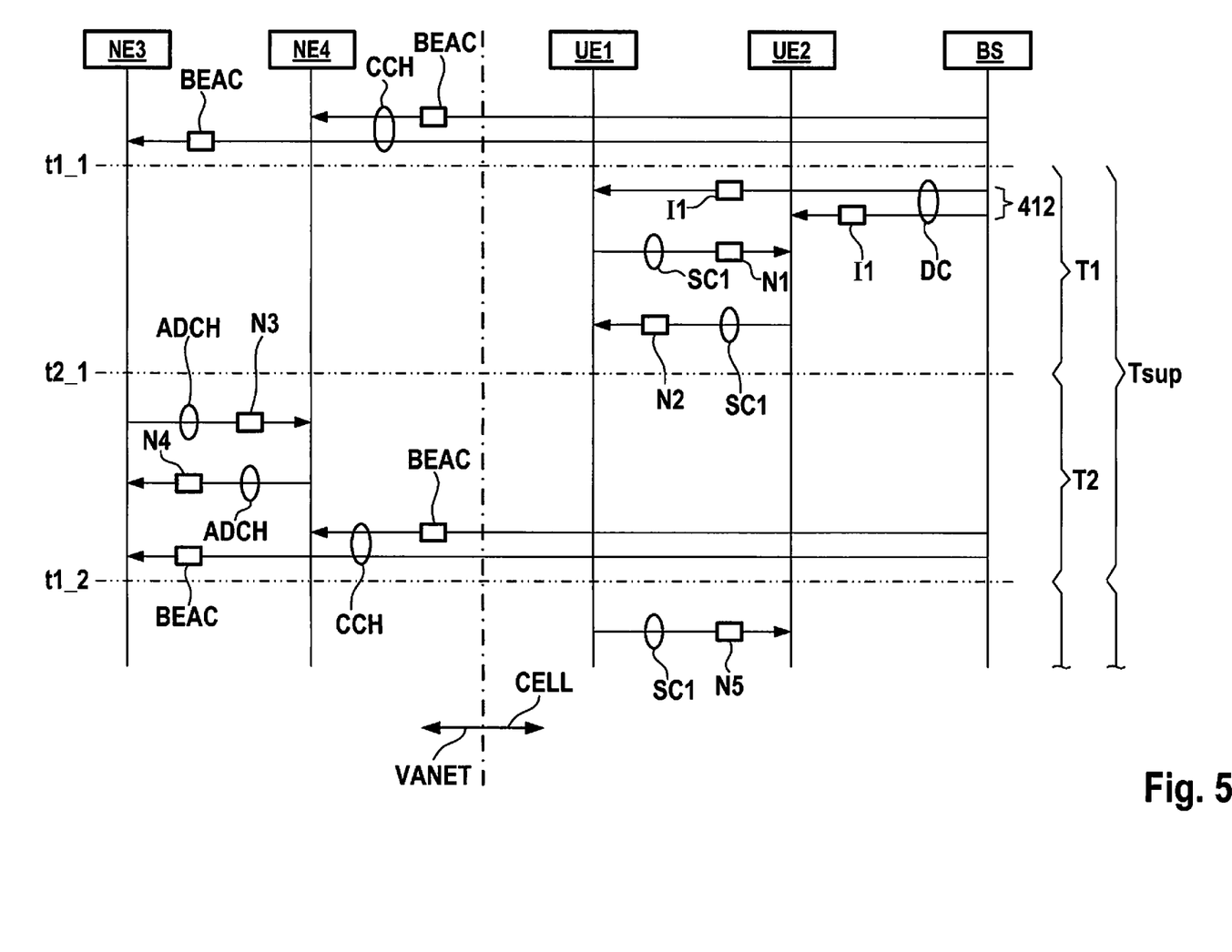

FIG. 5 shows a schematic sequence diagram. Higher-order time frame Tsup includes first time frame T1 and second time frame T2. Higher-order time frame Tsup begins at points in time t1_1, t1_2. First time frame T1 ends at point in time t2_1. Second time frame T2 begins at point in time t2_1 and ends at point in time t1_2. Indication I1 includes an association of sidelink resources for sending useful data N1, N2 on sidelink channel SC1. Indication I1 thus means that in first time frame T1, sidelink channel SC1 is actively utilized, and network units NE3 and NE4 of ad hoc wireless communications network VANET refrain from accessing the ad hoc channel.

In second time frame T2, useful data N3 and N4 are sent on ad hoc channel ADCH. Network unit BS prevents the allocation of sidelink resources in second time frame T2. As a result, prior to an arbitration of ad hoc channel ADCH by network units NE3, NE4, a check is made as to whether second time frame T2 is active. If this is the case, an arbitration of ad hoc channel ADCH takes place when useful data N3, N4 to be sent are present. If the arbitration is successful, useful data N3, N4 are sent.

Within second time frame T2, network unit BS sends an indication BEAC on control channel CCH which signals points in time t1_1, t1_2, and thus the beginning of next higher-order time frame Tsup. Indication BEAC is also referred to as a second indication and/or beacon. Indication BEAC is sent by network unit BS to the number of network units NE3, NE4, for example at regular time intervals, in the sense of a broadcast. Indication BEAC additionally or alternatively indicates point in time t2_1, i.e., the beginning of second time frame T2.

In the example shown, indication BEAC is sent on channel CCH, and thus in second time window T2. Alternatively, indication BEAC is sent on downlink channel DC, it being possible for indication BEAC to be sent independently of the first or second time window.

Within higher-order time frame Tsup, second time frame T2 follows first time frame T1. This has the advantage that network unit BS stores the schedulable sidelink resources in first time frame T1, and second time frame T2 is available to network units NE3, NE4. In one alternative specific embodiment, second time frame T2 is situated first in higher-order time frame Tsup, and first time frame T1 follows second time frame T2. In another specific embodiment, time frames T1 and T2 are separated from one another by a safety time period in order to reduce mutual influencing of the two wireless communications networks VANET, CELL.

In one specific embodiment, network units UE1, UE2 reduce their energy requirements by operating the particular transceiver with reduced energy consumption during second time period T2, since neither transmission nor reception is planned during second time period T2.

In one specific embodiment, network units NE3, NE4 reduce their energy requirements by operating the particular transceiver with reduced energy consumption during first time period T1, since neither transmission nor reception is planned during first time period T1.

Further aspects of the present invention are described in the following paragraphs:

(Paragraph 1) A method for operating a network infrastructure-side network unit, the method including: sending a first indication to a number of roadside network units of a cell-based wireless communications network, the first indication including a reservation of sidelink resources of a sidelink channel in an unlicensed frequency range in a first time frame; and sending a second indication to a number of roadside network units of an ad hoc wireless communications network, the second indication including a reservation of an ad hoc channel in the unlicensed frequency range for a second time frame, the first and the second time frames being temporally disjoint.

(Paragraph 2) The method according to Paragraph 1, the second time frame being situated within a higher-order time frame, and the second time frame being situated in a chronologically subsequent section of the higher-order time frame.

(Paragraph 3) The method according to Paragraph 1 or 2, the first indication and the second indication being transmitted on a downlink channel.

(Paragraph 4) The method according to Paragraph 1 or 2, the first indication being transmitted on a downlink channel, and the second indication being transmitted on a control channel of the ad hoc channel.

(Paragraph 5) The method according to one of the preceding paragraphs, including: ascertaining a state of the sidelink channel; ascertaining the size of the first time frame as a function of the state of the sidelink channel.

(Paragraph 6) The method according to one of the preceding paragraphs, including: ascertaining a state of the ad hoc channel; and ascertaining the size of the second time frame as a function of the state of the ad hoc channel.

(Paragraph 7) The method according to one of the preceding paragraphs, the second time frame being ascertained as a function of the number of network units that are accessible and capable of ad hoc communication.

(Paragraph 8) A network infrastructure-side network unit that is designed to: send a first indication to a number of roadside network units of a cell-based wireless communications network, the first indication including a reservation of sidelink resources of a sidelink channel in an unlicensed frequency range in a first time frame; and send a second indication to a number of roadside network units of an ad hoc wireless communications network, the second indication including a reservation of an ad hoc channel in the unlicensed frequency range for a second time frame, the first and the second time frames being temporally disjoint.

(Paragraph 9) A method for operating a roadside network unit of an ad hoc wireless communications network, the method including: ascertaining useful data for sending to a further roadside network unit of the ad hoc wireless communications network; receiving an indication from a network infrastructure-side network unit, the indication including a reservation of an ad hoc channel in an unlicensed frequency range for a time frame; arbitrating the ad hoc channel during the time frame, and sending the useful data to the further roadside network unit on the ad hoc channel during the time frame if the arbitration of the ad hoc channel was successful.

(Paragraph 10) The method according to Paragraph 9, the second time frame being situated within a higher-order time frame, and the second time frame following the first time frame.

(Paragraph 11) The method according to Paragraph 9 or 10, the indication being received from the network infrastructure-side network unit on a downlink channel of a cell-based wireless communications network.

(Paragraph 12) The method according to Paragraph 9 or 10, the indication being received from the network infrastructure-side network unit on a control channel of the ad hoc wireless network.

(Paragraph 13) The method according to one of Paragraphs 9 through 12, the ad hoc channel not being arbitrated by the network unit outside the time frame.

(Paragraph 14) A roadside network unit of an ad hoc wireless communications network, a processor being designed to ascertain useful data for sending to a further roadside network unit of the ad hoc wireless communications network; an antenna and a transceiver being designed to receive an indication from a network infrastructure-side network unit, the indication including a reservation of an ad hoc channel in an unlicensed frequency range for a time frame; to arbitrate the ad hoc channel during the time frame; and to send the useful data to the further roadside network unit on the ad hoc channel during the time frame if the arbitration of the ad hoc channel was successful.

(Paragraph 15) A motor vehicle that includes the roadside network unit according to the preceding paragraph.

(Paragraph 16) A method for operating a cell-based wireless communications network and an ad hoc wireless communications network that includes the method according to one of Paragraphs 1 through 7 and the method according to one of Paragraphs 9 through 13.

What is claimed is:

1. A system, comprising:
a base station including a processor, memory, and a transceiver, the base station configured to:
send a first indication to a number of user equipment (UEs) of a cell-based wireless communications network, the first indication including a reservation of sidelink resources of a sidelink channel in an unlicensed frequency range in a first time frame, and
send a second indication to a number of UEs of an ad hoc wireless communications network, the second indication including a reservation of an ad hoc channel in the unlicensed frequency range for a second time frame, the first time frame and the second time frame being temporally disjoint; and
a UE including a processor, memory, and a transceiver, the UE configured to:
ascertain useful data for sending to a further UE of the ad hoc wireless communications network;
receive the second indication from the base station, the second indication including the reservation of the ad hoc channel in the unlicensed frequency range for the second time frame;
arbitrate the ad hoc channel during the second time frame; and
send the useful data to the further UE on the ad hoc channel during the second time frame when the arbitration of the ad hoc channel is successful.

2. A method for operating a cell-based wireless communications network and an ad hoc wireless communications network, comprising:
sending, by a base station, a first indication to a number of user equipment (UEs) of a cell-based wireless communications network, the first indication including a reservation of sidelink resources of a sidelink channel in an unlicensed frequency range in a first time frame;
sending, by the base station, a second indication to a number of UEs of the ad hoc wireless communications network, the second indication including a reservation of an ad hoc channel in the unlicensed frequency range for a second time frame, the first time frame and the second time frame being temporally disjoint;
ascertaining, by UE of the ad hoc wireless of the ad hoc wireless communications network;
receiving, by the UE of the ad hoc wireless communication network, the second indication from the base station, the second indication including the reservation of the ad hoc channel in the unlicensed frequency range for the second time frame;
arbitrating, by the UE of the ad hoc wireless communication network, the ad hoc channel during the second time frame; and
sending, by the UE of the ad hoc wireless communication network, the useful data to the further UE on the ad hoc channel during the second time frame when the arbitration of the ad hoc channel is successful.

3. The method as recited in claim 2, wherein the first indication and the second indication are transmitted on a downlink channel.

4. The method as recited in claim 2, wherein the first indication is transmitted on a downlink channel, and the second indication is transmitted on a control channel of the ad hoc channel.

5. The method as recited in claim 2, further comprising the following steps:
ascertaining, by the base station, a state of the sidelink channel; and ascertaining, by the base station, a size of the first time frame as a function of the state of the sidelink channel.

6. The method as recited in claim 2, further comprising the following steps:
ascertaining, by the base station, a state of the ad hoc channel; and
ascertaining, by the base station, a size of the second time frame as a function of the state of the ad hoc channel.

7. The method as recited in claim 2, wherein the second time frame is ascertained as a function of the number of network units that are accessible and capable of ad hoc communication.

8. The method as recited in claim 2, wherein the second time frame is situated within a higher-order time frame, and the second time frame is situated in a chronologically subsequent section of the higher-order time frame.

9. The method as recited in claim 2, wherein the second time frame is situated within a higher-order time frame, and the second time frame follows the first time frame.

10. The method as recited in claim 2, wherein the second indication is received from the base station on a downlink channel of the cell-based wireless communications network.

11. The method as recited in claim 2, wherein the second indication is received from the base station on a control channel of the ad hoc wireless network.

12. The method as recited in claim 2, wherein the ad hoc channel is not arbitrated by the UE of the ad hoc wireless communication network outside the second time frame.

* * * * *